United States Patent Office 3,773,890
Patented Nov. 20, 1973

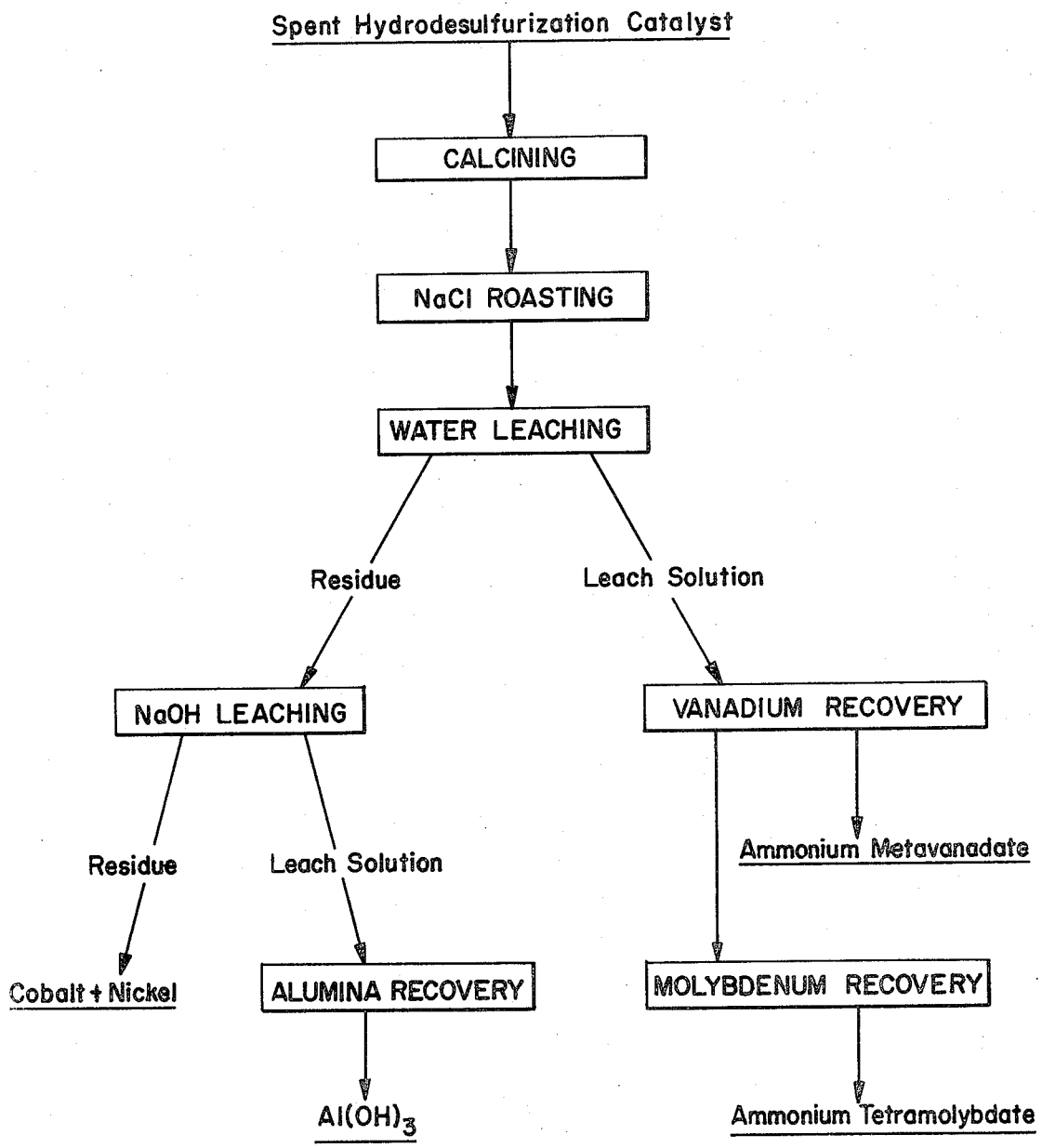

3,773,890
PROCESS FOR EXTRACTING VALUES FROM SPENT HYDRODESULFURIZATION CATALYSTS
Joseph S. Fox, Lewiston, N.Y., and John E. Litz, Lakewood, Colo., assignors to Union Carbide Corporation, New York, N.Y.
Filed Apr. 14, 1972, Ser. No. 244,136
Int. Cl. C01f 7/02; C01g 31/00, 39/00, 51/00, 53/00
U.S. Cl. 423—58                                                10 Claims

ABSTRACT OF THE DISCLOSURE

A process for extracting vanadium, molybdenum, alumina, and at least one of the values selected from a group consisting of cobalt and nickel from a spent hydrodesulfurization catalyst containing the same and used for decreasing the sulfur contents in crude oils. The process comprises calcinating the catalyst to remove carbon followed by roasting with NaCl to convert vanadium and molybdenum values to a water soluble form. The roasted product is leached with water to remove vanadium and molybdenum values and the residue treated with an alkaline solution to dissolve aluminum values. The aluminum containing solution is removed from the residue containing nickel and/or cobalt values and reacted with an acid to precipitate aluminum hydroxide. The molybdenum and vanadium values may be recovered from the leach solution by extraction with a tertiary amine.

FIELD OF THE INVENTION

This invention is directed to a process for recovering vanadium, molybdenum, alumina and at least one of the values selected from the group consisting of cobalt and nickel from a spent hydrodesulfurization catalyst containing the same.

BACKGROUND OF THE INVENTION

The oil industry has been marketing crude oils containing various amounts of sulfur to commercial and private enterprises since the industrial revolution. The clouds of smoke ascending into the skies from chimneys of various types and sizes was once considered a sign of progress, that is, man's feat in tapping the earth's natural resources to operate machinery, supply heat and the like. After the smoke settled however, ecologists realized that the advantages derived from certain natural resources such as crude oils, was outweighed by their disadvantages. For example, the sulfur contents in crude oil contributed to the pollution of the air thereby effecting the health of living creatures and contributing to the acceleration of the useful life of inanimated objects. The detrimental effects of using high sulfur containing oils has recently been brought into sharper focus and ecologists have succeeded in having many local and State governments pass air pollution regulations prohibiting the use of high sulfur containing crude oils. Industry has responded by incorporating oil desulfurization processes into their oil refinement techniques to produce oil with minimum sulfur contents, that is, a sulfur content of less than about 0.3% for light fuels and 1% for heavy fuels.

One such desulfurization process entails the passing of hydrogen through crude oil at a suitable temperature and pressure in the presence of a catalyst in a fluidized-bed system. The sulfur in the oil reacts with the hydrogen and forms gaseous $H_2S$ which is driven off. The catalyst being primarily used is an alumina-base material containing cobalt and molybdenum as the active agents. During desulfurization, the catalyst gradually picks up vanadium and nickel from the oil until these impurities reduce its catalytic efficiency to a level where it no longer effectively aids the reaction of hydrogen with the sulfur in the oil. At this point, the spent catalyst is removed and replaced by a new catalyst.

The spent catalyst contains vanadium, molybdenum, alumina, cobalt and nickel, any of which if could be recovered can be used in various other processes. Alumina, cobalt and molybdenum values are required to produce fresh catalyst and their recovery from spent catalyst could be admirably utilized to provide a regeneration type catalyst for the desulfurization process of crude oil.

Vanadium and nickel values contained in the spent catalyst are valuable by-products from the oil and if they can be economically extracted, they could be used in industry for various purposes.

The present invention is directed to a process for extracting from an aluminum-cobalt-molybdenum containing spent hydrodesulfurization catalyst the values of vanadium, alumina, cobalt, molybdenum and nickel. The extracted values of alumina, cobalt and molybdenum can effectively be used to produce a fresh desulfurization catalyst supply while the values of vanadium and nickel can be used by industry in various applications. When an aluminum-nickel-molybdenum containing catalyst is employed, then the values recovered from the spent catalyst will be vanadium, alumina, molybdenum and nickel.

SUMMARY OF THE INVENTION

Basically, the invention relates to a process for extracting vanadium, alumina, molybdenum and at least one value selected from the group consisting of cobalt and nickel, from a spent hydrodesulfurization catalyst containing these values. The catalyst primarily used in the oil desulfurization process is either an aluminum-cobalt-molybdenum containing catalyst or an aluminum-nickel-molybdenum containing catalyst. The spent catalyst of the oil desulfurization process is first calcined to remove substantially all of the carbon and thereafter subjected to a NaCl roasting for a time period and at a temperature sufficient to substantially solubilize the vanadium and molybdenum values therein. It has been found that based on the composition at which the catalyst becomes inefficient to aid the reaction of hydrogen with sulfur in crude oil due to impurity pickup, an amount of NaCl between about 0.1 and about 0.6 lb. per lb. of the pre-calcined catalyst would be suitable for this roasting step. The calcines from the NaCl roast are then water-leached to substantially remove the soluble vanadium and molybdenum salts contained therein while the alumina, nickel and cobalt, if present, remains in the residue. The NaCl roasting step can be repeated at least once to increase the solubilization of vanadium, if desired. The vanadium and molybdenum salts in the filtrate (leach liquor) are then extracted with a tertiary amine and stripped with an alkaline solution, such as a $Na_2CO_3$ solution. The vanadium can then be extracted by various processes such as being precipitated as ammonium metavanadate using ammonium sulfate [$(NH_4)_2SO_4$] at a pH of about 8. The molybdenum remaining in the aqueous raffinate can be extracted with a tertiary amine and stripped with $NH_3$, followed by acidification at 80° C. to a pH of about 2.5 with hydrochloric acid (HCl) so as to form ammonium tetramolybdate as a precipitate.

The tail or residue from the NaCl roast can be reacted with NaOH in an autoclave at a temperature and for a time period sufficient to substantially dissolve all the soluble salts of aluminum in the residue. The contents of the autoclave are then diluted with water and boiled to substantially dissolve all the soluble salts of aluminum ($NaAlO_2$). Thereafter the mixture is filtered whereupon the cobalt, if present, and nickel values remain in the residue with the aluminum values concentrated in the filtrate. The $NaAlO_2$ filtrate can be reacted with an acid, such as $H_2SO_4$, at a pH of between about 4 and about 7, whereupon $Al(OH)_3$ is precipitated after which it can be extracted by conventional filtering means. The $(Al(OH)_3$ residue can then be water-washed to form a wet $Al(OH)_3$ which can then be used to produce new desulfurization catalysts. The cobalt, if present, and nickel values contained in the residue can be commercially sold as a concentrate or could be further processed to form the metals of cobalt and nickel by conventional techniques. For example, the cobalt and nickel could be extracted by the hydrometallurigical treatment of oxidized nickel-cobalt concentrate described in a paper in the "Canadian Mining and Metallurgical Bulletin" by D. Maschmeyer and B. Benson from Sherritt Gordon Mines Limited, given in Toronto in March 1965. This method consists of (1) reducing the metal oxide with hydrogen, (2) leaching with $H_2SO_4$, (3) separation of cobalt by the cobaltic amine-hydrogen reduction process and then conversion to metal by hydrogen reduction.

The sole drawing shows a schematic flowsheet for the recovery of vanadium, molybdenum, alumina, cobalt and nickel values from a spent hydrodesulfurization catalyst containing these values.

A preferred embodiment of the invention, as shown schematically in the drawing, would first require the spent hydrodesulfurization catalyst, containing vanadium, molybdenum, alumina and at least one of the values of cobalt and nickel, to be calcined to remove substantially all of the carbon in the catalyst. A carbon content in the catalyst of less than about 0.10%, or preferably less than about 0.01% would be satisfactory. This step is performed because carbon in the spent catalyst is believed to interfere with the solubilization of vanadium values during the roasting step of the process. The calcining can be accomplished by any known technique such as by placing a thin bed of the catalyst in a silica dish and then placing the dish in a heated muffle furnace wherein an excessive amount of wet air is passed over it. About a ⅛ inch bed of the catalyst in a muffle furnace heated to about 725° C. for a period of about 1 to 4 hours is sufficient for this purpose.

The calcined spent catalyst is thereafter subjected to a NaCl roasting step in a wet air atmosphere at a temperature and for a time period sufficient to substantially solubilize the vanadium and molybdenum values therein. The amount of NaCl suitable for this roasting step can vary between about 10% and about 60% of the weight of the precalcined spent catalyst, and preferably about 40% of the weight of the precalcined spent catalyst as described above. If the vanadium and molybdenum contents in the spent catalyst are known, then the amount of NaCl in the roast should be at least sufficient to insure the following reactions:

(I) 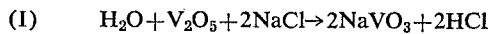
$H_2O + V_2O_5 + 2NaCl \rightarrow 2NaVO_3 + 2HCl$ (II) 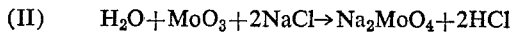
$H_2O + MoO_3 + 2NaCl \rightarrow Na_2MoO_4 + 2HCl$ An amount of NaCl between about 100% and about 200% of the stoichiometric amount necessary for both the above reactions would be satisfactory.

The roasting temperature and time period can also vary between about 525° C. and about 925° C., and between about 1 hour and 4 hours, respectively. Preferably the temperature should be between about 575° C. and about 825° C. and the time should be about one hour. Roasting periods longer than about 4 hours would not substantially increase the vanadium recovery but only prolong the roasting operation.

The roasted spent catalyst is thereafter water leached by conventional techniques whereupon the vanadium and molybdenum contained therein are reported in the filtrate of the water-leach liquor while alumina, cobalt, if present, and nickel remain in the residue or tailings. Upon separating the filtrate, the vanadium and molybdenum salts can then be extracted by conventional techniques such as through the use of a tertiary amine followed by a stripping with an alkaline solution, such as $Na_2CO_3$ solution. The vanadium values can thereafter be precipitated as ammonium metavanadate with the use of $(NH_4)_2SO_4$ at a pH of about 8. Likewise, the molybdenum can be precipitated as ammonium tetramolybdate with the use of HCl at a pH of about 2.5.

As shown in the drawing, the NaCl roasted, water-leached tailings from the spent catalyst is reacted at an elevated temperature of between about 200° C. and about 300° C. for a period of at least one hour, preferably more than about 2 hours, with an alkaline solution, such as NaOH, followed by dilution with water whereupon the solution is boiled to dissolve substantially all the soluble salts of aluminum ($NaAlO_2$). This reaction step could also be performed under pressure of between about 200 and about 3000 p.s.i.g. whereupon the time period for the reaction could be reduced. The mixture is thereafter filtered whereupon the aluminum values report to the filtrate and the cobalt if present and nickel values remain in the residue. The aluminum-containing pregnant filtrate upon being reacted with an acid, such as $H_2SO_4$, at a pH of between about 4 and about 7, preferably about 6.4, will produce a wet $Al(OH)_3$ which is admirably suited for use in the preparation of new desulfurization catalysts.

The NaOH leached residue containing the cobalt, if present, and nickel values can be sold commercially without further processing, or if desired, the cobalt and nickel metals could be extracted by conventional techniques.

It is to be understood that vanadium or any one of the above-identified values could be extracted by following only the steps necessary for the extracting of the particular value desired.

The following examples will serve to illustrate the invention and are not intended to limit the scope of the invention in any way.

Four samples of spent hydrodesulfurization catalyst, each containing different proportions of various values, were used as the initial starting material for the process of this invention. Samples numbered 1, 2 and 3 were dry black spheres of which 95% by weight passed through a 50-mesh U.S. Standard screen. Sample numbered 4 was black extrusions measuring about ¹⁄₃₂ inch in diameter by about ³⁄₁₆ inch long. The extrusions were saturated with kerosene and had to be oven dried at 110° C. for 48 hours.

The four sample lots were subjected to chemical and spectrographic analysis, the results of which are shown in Table 1. From the data illustrated, samples 1 through 3 contained vanadium in the range between 21%% and 44% while sample 4 contained only about 6% vanadium.

TABLE 1

| Sample | Chemical, percent | | | |
|---|---|---|---|---|
| | 1 | 2 | 3 | 4 |
| $V_2O_5$ | 20.7 | 35.3 | 43.8 | 5.93 |
| $MoO_3$ | 7.77 | 6.57 | 5.33 | 8.28 |
| Co | 0.99 | 1.18 | 0.88 | 2.64 |
| Ni | 1.10 | 1.95 | 1.98 | 1.61 |
| $Al_2O_3$ | [1] N.A. | 29.5 | 23.9 | 42.8 |
| $SiO_2$ | N.A. | 0.68 | N.A. | N.A. |
| C | 13.6 | 16.1 | 15.1 | 18.6 |
| S | 8.5 | 15.7 | 26.0 | 7.50 |
| | Spectrographic analyses | | | |
| Al | Major | [2] | [2] | [3] |
| B | 0.002-0.02 | | 0.002-0.02 | 0.004 0.04 |
| Ca | 0.01-0.1 | 0.02-0.2 | 0.02-0.2 | 0.03-0.3 |
| Co | [2] | [2] | [2] | [2] |
| Cr | 0.08-0.8 | 0.04-0.4 | 0.004-0.04 | 0.002-0.02 |
| Cu | 0.01-0.1 | 0.08-0.8 | 0.03-0.3 | 0.008-0.08 |
| Fe | 0.08-0.8 | 0.2-2.0 | 0.08-0.8 | 0.03-0.3 |
| Ga | | 0.04-0.4 | | |
| Mg | 0.08-0.8 | 0.2-2.0 | 0.08-0.8 | 0.03-0.3 |
| Mn | 0.02-0.2 | 0.008-0.08 | 0.002-0.02 | [4] |
| Mo | [2] | [2] | [2] | [2] |
| Na | 0.1-1.0 | 0.08-0.8 | 0.08-0.8 | 0.2-2.0 |
| Ni | [2] | [2] | [2] | [2] |
| Pb | 0.01-0.1 | 0.03-0.3 | 0.01-0.1 | 0.1-1.0 |
| Si | 0.08-0.8 | 0.1-1.0 | 0.2-2.0 | 0.08-0.8 |
| Sn | 0.03-0.3 | 0.008-0.08 | 0.03-0.3 | [4] |
| Ti | 0.008-0.08 | 0.02-0.2 | 0.02-0.2 | 0.004-0.04 |
| V | [2] | [2] | [2] | [2] |

[1] N.A.=Not analyzed.
[2] See above.
[3] [4] Not found.

EXAMPLE 1

The spent catalyst of sample 1 was placed on a silica dish to a height of about ⅛ inch and then calcined in a wet air atmosphere at 750° C. in a muffle furnace for 4 hours. The wet air atmosphere was obtained by passing an excessive amount of wet air over the spent catalyst in the dish. The calcining step was performed so as to substantially remove any carbon from the catalyst prior to subjecting the catalyst to a roasting step since carbon is known to interfere with the solubilization of vanadium values during roasting. The calcined residue, weighing about 75% of the original weight of the catalyst, was thereafter roasted at 825° C. for one hour with 40% NaCl as based on the original weight of the precalcined catalyst. The roasting was performed in a muffle furnace in which an excessive amount of wet air was passed over the catalyst bed. The roasted spent catalyst was removed from the furnace, air cooled to ambient temperature, and then water leaching for one hour at its boiling point. This was followed by a filtering and washing step whereupon the final residue was oven dried and weighed, and the filtrate plus washings were combined and measured. An analysis of the residue and filtrate solution revealed that 96.7% of the vanadium values were extracted with nearly all of the vanadium and molybdenum being reported to the water-leach liquor while the cobalt, nickel and alumina remained in the residue. The results of a spectrographic analysis of the water leach liquor and the residue are shown in Table 2.

TABLE 2

| Leach liquor | | Residue | | | |
|---|---|---|---|---|---|
| Values | Range in g./l. | Values | Range in percent | Values | Range in percent |
| Al | 0.01-0.1 | Al | Major | Mo | 0.04-0.4 |
| Cr | 0.02-0.2 | Ba | 0.001-0.01 | Na | 0.2-2.0 |
| Fe | 0.002-0.02 | Be | 0.0004-0.004 | Ni | 1-10 |
| Mo | 0.4-4.0 | Ca | 0.01-0.1 | Pb | 0.008-0.08 |
| Na | Major | Co | 1-10 | Si | 0.8-8.0 |
| Si | 0.002-0.02 | Cr | 0.08-0.8 | Sn | 0.008-0.08 |
| Sn | 0.01-0.1 | Fe | 0.08-0.8 | Ti | 0.01-0.1 |
| $V_2O_5$ [1] | 12.5 | Mg | 0.1-1.0 | $V_2O_5$ [1] | 1.46 |
| | | Mn | 0.02-0.2 | | |

[1] Chemical analysis.

NOTE.—No other impurities were detected by the emission spectrograph.

The data tabulated in Table 2 demonstrate that an excellent separation of the cobalt, nickel and aluminum from the vanadium and molybdenum in the spent catalyst was achieved using the process of this invention. Since the leach liquor contained only traces of other metallic ions, conventional methods can be employed to recover the vanadium and molybdenum values.

EXAMPLE 2

Five portions of the spent catalyst of sample 2, shown in Table 1, weighing 0.070 lb. each, were calcined as in Example 1 except the temperature varied from 525° C. to 725° C. The temperature was found not to be critical but only had to be sufficient since the purpose of the calcining was to substantially reduce the carbon content in the catalyst. An analysis of the calcined spent catalyst revealed that only about 0.01% carbon was present in the calcines.

The calcined spent catalyst was roasted using NaCl as described in Example 1 except that the temperature was varied to determine the effect of temperature on the vanadium solubilization and also on the alumina phase in the catalyst. The water-leach liquor was analyzed for vanadium contents and the tails or residue was analyzed for alumina phase. The results are summarized in Table 3.

TABLE 3

| Temperature, ° C.: | Percent NaCl [1] | $V_2O_5$, percent extraction | Form of $Al_2O_3$ |
|---|---|---|---|
| 525 | 60 | 74 | Gamma, |
| 575 | 60 | 85 | Do, |
| 625 | 60 | 92 | Do, |
| 675 | 60 | 95 | Do, |
| 725 | 60 | 91 | Alpha, |

[1] As based on the weight of the precalcined spent catalyst.

As indicated in Table 3, 95% of the vanadium can be solubilized at 675° C. in a 60% NaCl roasting while maintaining the alumina in a gamma phase, the gamma phase being preferable in a catalyst because the alpha phase of $Al_2O_3$ does not give the catalytic characteristics required in the oil catalyst for sulfur removal. The tails (residue) of the roasted spent catalyst were reroasted, using 25% NaCl at a temperature of 675° C. for 2 hours whereby an additional 3% of the vanadium was solubilized. Thus, adequate vanadium solubilization can be achieved at a roasting temperature of about 675° C. without changing the alumina in sample 2 of Table 1 to the alpha form.

EXAMPLE 3

Three portions of the spent catalyst of sample 2 of Table 1, weighing 0.07 lb. each, were calcined as in Example 1. The calcined catalyst was then roasted with various amounts of NaCl ranging from 110% to 200% of the stoichiometric amount of NaCl required to form $NaVO_3$ with the $V_2O_5$ in the catalyst according to the following equation:

(III)   $2NaCl + H_2O + V_2O_5 \rightarrow 2NaVO_3 + 2HCl$

The NaCl roasting was performed as in Example 1 and the vanadium extraction results were likewise calculated as described in Example 1. The results are tabulated in Table 4 and show that 96% of the vanadium can be solubilized in a simple roast using 110% of the stoichiometric amount needed for the above reaction.

TABLE 4

| NaCl: [1] | Stoichiometric | $V_2O_5$ extraction, percent |
|---|---|---|
| 33 | 110 | 96 |
| 40 | 133 | 96 |
| 60 | 200 | 95 |

[1] As based on the weight of the precalcined spent catalyst.

An amount of NaCl under 110% of the stoichiometric amount required for reaction III could be used, however it may not adequately provide sufficient NaCl to form $Na_2MoO_4$ from the $MoO_3$ in the catalyst. About 100% of the stoichiometric amount required for the above reactions I and II would appear to be the lower limit, while higher than 200% of the stoichiometric amount would appear to have no effect on increasing the extraction of vanadium or molybdenum.

EXAMPLE 4

One portion of the spent catalyst of Sample 2 of Table 1, weighing 0.07 lb., was calcined and then roasted with 33% NaCl (as based on the weight of the precalcined catalyst) at 725° C. for 1 hour.

An analysis revealed that 95% of the vanadium was solubilized during the one hour period. A second portion of the identical spent catalyst was likewise calcined and roasted as the first portion except that the roasting time was extended to two hours. An analysis of this two-hour roasted catalyst revealed that 96% of the vanadium was solubilized. Thus, a one hour roasting with 33% NaCl will adequately solubilize the vanadium in this catalyst while extending the roasting time will increase the vanadium solubilization desired, the roasting time can vary.

EXAMPLE 5

Using the spent catalyst of sample 3 of Table 1, and following the procedure of Example 1, 92% of the vanadium in the catalyst can be solubilized in a single 60% NaCl roast at 625° C. for a 2 hour period. A reroasting of the tails, as outlined in Example 2, using a 25% NaCl roast can increase the total vanadium solubilization to 98%.

EXAMPLE 6

Four portions of the spent catalyst of sample 4 of Table 1, each weighing 0.07 lb., were calcined and roasted as described in Example 1 except that the roasting temperature and NaCl addition are as shown in Table 5. Also shown in Table 5 are the vanadium solubilization results from the first roast and the vanadium solubilization from a second roast performed as described in Example 2. The data demonstrates that 99% of the vanadium can be solubilized from a spent catalyst containing only 5.95% $V_2O_5$. However, a higher roasting temperature is preferable as the $V_2O_5$ contents in the catalyst decreases.

TABLE 5

| Temperature | | 1st roast—2 hr. | | | 2d roast—2 hr. | | | Total $V_2O_5$ extraction, percent |
|---|---|---|---|---|---|---|---|---|
| Calcination step, °C. | NaCl roast, °C. | NaCl add., percent | $V_2O_5$ in tails, percent | $V_2O_5$ extraction percent | NaCl add., percent | $V_2O_5$ in tails, percent | $V_2O_5$ extraction, percent | |
| 575 | 575 | 60 | 3.60 | 66 | 25 | 2.00 | 52 | 84 |
| 625 | 625 | 60 | 2.90 | 73 | 25 | 1.18 | 64 | 90 |
| 675 | 675 | 60 | 1.50 | 86 | 25 | 0.75 | 5.4 | 94 |
| 825 | 825 | 60 | 0.69 | 94 | 25 | <0.05 | <99 | <99 |

EXAMPLE 7

Three portions of the NaCl roasted, water-leached tailings of the spent catalyst of Example 6 (roasted at 625° C. and corresponding to the second tabulated test in Table 5 where 90% $V_2O_5$ was extracted) were mixed with varying amounts of NaOH and then baked in an oven overnight at 220° C. The hard baked residue was then pulverized and water-leached at the boiling point for one hour whereupon it was then filtered. The oven-dried residue and the filtrate were then analyzed for $Al_2O_3$. The results are shown in Table 6 and show that 88% of the alumina can be solubilized to $NaAlO_2$ using 0.9 lb. of NaOH/lb. of tails or 1.4 lb. NaOH/lb. of $Al_2O_3$ dissolved. The filtrate contained no cobalt or nickel as shown by spectrographic analyses.

The filtrate of test 3 shown in Table 6 was adjusted to pH 6.4 with $H_2SO_4$ and then boiled for 15 minutes. The solution was thereafter filtered and water-washed whereupon the residue showed about a 3% Na content. The wet $Al(OH)_3$ obtained from the reaction:

$$2NaAlO_2 + H_2SO_4 + 3H_2O \rightarrow 2Al(OH)_3 + Na_2SO_4 + H_2O$$

was repulped, boiled and again filtered. A chemical analysis revealed a 0.02% Na content while a spectrographcal analysis revealed, in addition to aluminum, a 0.03 to 0.3% Ga, 0.2 to 2.0% Mo, 0.02 to 0.2% Pb, 0.04 to 0.4% Si and 0.4 to 4.0% V. The wet $Al(OH)_3$ which is equivalent to about 9% dry $Al_2O_3$, was found to be admirably suited for producing a new supply of alumina for a desulfurization catalyst.

TABLE 6

| Test No. | #/# $Al_2O_3$ In tails | #/# $Al_2O_3$ Solubilized | Percent $Al_2O_3$ solubilized to $NaAlO_2$ | Spectrographic analysis residue |
|---|---|---|---|---|
| 1 | 0.60 | 1.4 | 58 | Major in Al, 0.8-8.0% Ni, 0.8-8.0% Co, |
| 2 | 0.90 | 1.4 | 88 | 2-20% Al, 0.8-8% Ni, 0.8-8.0% Co. |
| 3 | 1.20 | 2.0 | 81 | 40.6% $Al_2O_3$*, 7.2% Ni*, 7.9% Co*. |

*Chemical analyses.
NOTE.—#=lbs.

EXAMPLE 8

Seven portions of the NaCl roasted, water-leached tailings of the spent catalyst of Example 6, containing different amounts of $Al_2O_3$, were reacted with NaOH solutions, having various NaOH concentrations, to form $$NaAlO_2$$

in a Parr stirred autoclave of 2-liter capacity at temperatures between 123° C. and 250° C. under pressure up to 300 p.s.i.g. After a specified reaction time in the autoclave, the contents were diluted with water, 750 ml. per 100 grams of the original tails, and boiled for one hour before filtering. The residue was washed with 500 ml. of water per 100 grams of original tails. The results of these tests are shown in Table 7.

TABLE 7

| Test No. | Time. hr. | Temp., °C. | Pressure, lb./sq. in., gauge | NaOH used— G./l. | NaOH used— G./g. $Al_2O_3$ in sample | Percent $Al_2O_3$ converted to $NaAlO_2$ |
|---|---|---|---|---|---|---|
| 1 | 5 | 123 | ¹ 0 | 540 | 2.4 | 35 |
| 2 | 6 | 250 | 300 | 540 | 2.4 | 95 |
| 3 | 2 | 250 | 300 | 540 | 2.4 | 96 |
| 4 | 2 | 250 | 300 | 540 | 1.8 | 81 |
| 5 | 2 | 250 | 300 | 540 | 1.4 | 72 |
| 6 | 2 | 220 | 200 | 540 | 1.2 | 66 |
| 7 | 2 | 250 | 300 | 450 | 1.8 | 81 |

¹ Atmospheric pressure.

The test shows that under controlled conditions, 96% of the $Al_2O_3$ in the tails can be converted to $NaAlO_2$.

The spectrographic results of the filtrate of tests 2 through 6 shown in Table 7 is tabulated in Table 8. These results demonstratively show that no nickel and negligible amounts of cobalt were dissolved. The cobalt and nickel in the residue could be sold as a concentrate or could be further processed by conventional methods to form the metals of nickel and cobalt.

TABLE 8

| Filtrate from Test Nos. of Table 7 | Range in grams per liter | | | | |
|---|---|---|---|---|---|
| | 2 | 3 | 4 | 5 | 6 |
| Al | [1]64 | [1]65 | [2]55 | [2]52 | [2]40.6 |
| Be | 0.0002-0.002 | 0.0002-0.002 | 0.0002-0.002 | 0.0002-0.002 | None |
| Ca | 0.002-0.02 | None | 0.002-0.02 | 0.006-0.06 | 0.002-0.02 |
| Cu | None | 0.006-0.06 | None | 0.002-0.02 | None |
| Co | 0.004-0.04 | None | None | 0.002-0.02 | 0.006-0.06 |
| Fe | 0.004 0.04 | None | None | 0.02-0.2 | 0.002-0.02 |
| Mo | 0.6 6.0 | 0.6-6.0 | 1-10 | 1-10 | 1-10 |
| Na | ([3]) | ([3]) | ([3]) | ([3]) | ([3]) |
| Ni | None | None | None | None | None |
| Pb | 0.002-0.02 | 0.1-1.0 | 0.01-0.1 | 0.1-1.0 | 0.01-0.1 |
| Si | 1-10 | 0.1-1.0 | 0.04-0.4 | 0.06-0.6 | 0.06-0.6 |
| Sn | 0.001-0.01 | 0.001-0.01 | 0.002-0.02 | 0.004-0.04 | 0.001-0.01 |
| Ti | 0.0006-0.006 | 0.001-0.01 | None | None | 0.0006-0.006 |
| V | 1-10 | 2-20 | 0.4-4.0 | 1-10 | 2-20 |

[1] Calc. value based on Al₂O₃ in residue.
[2] Chemical analyses.
[3] Major.

NOTE.—No other impurities were detected by the emission spectrograph.

What is claimed is:

1. A process for extracting vanadium, molybdenum, alumina and at least one of the values selected from the group consisting of cobalt and nickel, from a spent hydrodesulfurization catalyst containing these values comprising the steps:
   (a) calcining a spent hydrodesulfurization catalyst containing vanadium, molybdenum, alumina and at least one of the values selected from the group consisting of nickel and cobalt, so as to substantially reduce any carbon contained therein;
   (b) roasting said calcined spent catalyst with NaCl at a temperature and for a time period sufficient to substantially solubilize the vanadium and molybdenum values therein; said NaCl being present at least in a stoichiometric amount necessary for both the following reactions:

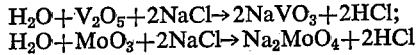

(c) water leaching said roasted calcined spent catalyst so as to substantially report the vanadium and molybdenum values to the filtrate while retaining the alumina, nickel and cobalt, if present, in the residue;
   (d) separating the filtrate from the resdiue;
   (e) extracting at least one of the values selected from the group consisting of vanadium and molybdenum from the filtrate;
   (f) reacting said residue from the water-leach solution with an alkaline solution at a temperature and time period to substantially dissolve all the soluble salts of aluminum in said residue;
   (g) filtering said alkaline-reacted solution so as to report the aluminum values to the filtrate while maintaining at least one of the values selected from the group consisting of nickel and cobalt in the residue;
   (h) reacting the aluminum-containing pregnant filtrate with an acid at a pH of between 4 and about 7 to precipitate Al(OH)₃; and
   (i) separating said Al(OH)₃ from the filtrate.

2. The process of claim 1 wherein the carbon contents in step (a) is reduced to less than about 0.10%.

3. The process of claim 1 wherein said roasting in step (b) is conducted at a temperature between about 525° C. and about 925° C. for a time period between about 1 hour and about 4 hours.

4. The process of claim 3 wherein after step (d) the steps (b) through (d) are repeated at least once on the residue of step (d).

5. The process of claim 3 wherein the NaCl in step (b) is added in an amount between about 100% and about 200% of the stiochiometric amount necessary for both the reactions:

$$H_2O + V_2O_5 + 2NaCl \rightarrow 2NaVO_3 + 2HCl$$
$$H_2O + MoO_3 + 2NaCl \rightarrow Na_2MoO_4 + 2HCl$$

6. The process of claim 3 wherein the NaCl in step (b) is added in an amount between about 10% and about 60% of the weight of the precalcined spent catalyst of step (a).

7. The process of claim 3 wherein said alkaline solution in step (f) is NaOH, said temperature is between about 200° C. and about 300° C. and said time period is more than about 2 hours.

8. The process of claim 7 wheren the acid in step (h) is H₂SO₄.

9. The process of claim 7 wherein the NaOH in step (f) is reacted with the residue from the water-leach solution of step (d) under pressure between about 200 and about 300 p.s.i.g.

10. The process of claim 3 wherein the vanadium and molybdenum values are extracted through the use of a tertiary amine followed by a stripping with an alkaline solution.

References Cited

UNITED STATES PATENTS

| 2,187,750 | 1/1940 | Marvin | 423—53 |
| 2,816,015 | 12/1957 | Donaldson | 423—58 |
| 3,357,821 | 12/1967 | Henrickson | 23—312 ME |
| 3,455,677 | 7/1969 | Litz | 75—101 BE |
| 3,539,290 | 11/1970 | Erickson et al. | 423—53 |

HERBERT T. CARTER, Primary Examiner

U.S. Cl. X.R.

423—53, 54, 61, 62, 68, 63, 138; 75—101 BE; 23—312 ME